United States Patent
Jain et al.

(10) Patent No.: US 9,621,031 B1
(45) Date of Patent: Apr. 11, 2017

(54) BUS VOLTAGE CORRECTION CIRCUIT

(71) Applicant: STMicroelectronics International N.V., Amsterdam (NL)

(72) Inventors: Jitendra Jain, Firozabad (IN); Ranajay Mallik, Ghaziabad (IN)

(73) Assignee: STMICROELECTRONICS INTERNATIONAL N.V., Schiphol (NL)

( * ) Notice: Subject to any disclaimer, the term of this patent is extended or adjusted under 35 U.S.C. 154(b) by 0 days.

(21) Appl. No.: 14/923,776

(22) Filed: Oct. 27, 2015

(51) Int. Cl.
*H05B 37/04* (2006.01)
*H02M 3/04* (2006.01)
*H05B 33/08* (2006.01)

(52) U.S. Cl.
CPC .......... *H02M 3/04* (2013.01); *H05B 33/0815* (2013.01); *H05B 33/0845* (2013.01); *H05B 33/0887* (2013.01)

(58) Field of Classification Search
CPC . H02M 3/04; H05B 33/0815; H05B 33/0845; H05B 33/0887
See application file for complete search history.

(56) References Cited

U.S. PATENT DOCUMENTS

| | | | | |
|---|---|---|---|---|
| 2009/0273288 A1* | 11/2009 | Zhao | ...................... | G09G 3/342 315/185 R |
| 2011/0084620 A1* | 4/2011 | Lee | .................... | H05B 33/0815 315/186 |
| 2011/0227503 A1* | 9/2011 | Yuan | .................... | G09G 3/3406 315/294 |
| 2015/0245433 A1* | 8/2015 | McCune, Jr. | ...... | H05B 33/0851 315/294 |

\* cited by examiner

*Primary Examiner* — Douglas W Owens
*Assistant Examiner* — James H Cho
(74) *Attorney, Agent, or Firm* — Gardere Wynne Sewell, LLP

(57) ABSTRACT

A tunable voltage regulator has an output generating a variable voltage and an input that receives a trimming signal for controlling the output variable voltage. A current regulating circuit operates to regulate a current flowing through a load in response to the variable voltage. A control circuit senses the variable voltage and a drop voltage of the current regulating circuit, and determines whether the current regulating circuit has failed to regulate the current flowing through the load because the variable voltage is too low. In response thereto, the control circuit generates the trimming signal to set the variable voltage to a value sufficient for the current regulating circuit to successfully regulate the current flowing through the load.

15 Claims, 4 Drawing Sheets

US 9,621,031 B1

BUS VOLTAGE CORRECTION CIRCUIT

TECHNICAL FIELD

The present invention relates to power supply circuits and, in particular, to a power supply circuit implementing a bus voltage correction so as to supply a minimum bus voltage required for load circuit operation.

BACKGROUND

Reference is made FIG. 1 showing a light emitting diode (LED) circuit 10. The circuit 10 includes a load circuit 12 formed by a string of series connected light emitting diodes (LEDs) 14. The string is connected between a node 16 and node 18. Node 16 may correspond to a supply bus in an implementation of the circuit 10 including plural strings of LEDs. A voltage regulator 20 is coupled to receive an unregulated supply voltage Vsup and operates to generate a fixed regulated bus voltage Vbus that is applied to the supply bus at node 16. A current sink driver circuit 22 is connected to node 18 and operates to regulate a constant load current $I_L$ through the load circuit 12 formed by the string of LEDs.

Those skilled in the art understand that there is a minimum voltage Vmin for the bus voltage Vbus that is necessary in order to be able to regulate the constant current $I_L$ in the string. That minimum voltage Vmin is set by the following equation:

$$V\text{min}=V_L+V_{min\text{-}drop}$$

where: $V_L$ is the voltage drop across the load formed by the string of LEDs from node 16 to node 18, and $V_{min\text{-}drop}$ is minimum required "drop-out" voltage across the channel of the MOSFET device within the current sink driver circuit 22 needed to maintain a regulated output for the load current $I_L$.

As the circuit 10 ages, the values for $V_L$ and $V_{min\text{-}drop}$ increase. This results in a corresponding increase in the value for Vmin. Accordingly, circuit designers will choose a value for the fixed regulated bus voltage Vbus that is higher than the anticipated range of Vmin over the life of the circuit 10. A side effect of making this choice for the regulated bus voltage Vbus value is an excess power dissipation (equal to (Vbus−Vmin)*$I_L$). In higher power load situations, the loss associated with this excess power dissipation can be excessive.

A need accordingly exists in the art for circuitry to dynamically maintain the regulated bus voltage generated by the voltage regulator at a value which substantially equals (or slightly exceeds) the instantaneous minimum voltage Vmin necessary to achieve a regulated constant current $I_L$ in the string.

SUMMARY

In an embodiment, a circuit comprises: a load coupled between a first node and a second node; a current regulating circuit coupled to the second node and configured to regulate a current flowing through the load; a tunable voltage regulator having an output configured to generate a variable voltage applied to the first node, said tunable voltage regulator having input configured to receive a trimming signal for controlling the output variable voltage; a control circuit having a first input configured to sense the variable voltage at the first node, a second input configured to sense a drop voltage at the second node, and having an output configured to generate the trimming signal, said control circuit configured to operate to: vary the trimming signal to decrease the variable voltage; determine from the sensed variable voltage and sensed drop voltage a failure of the current regulating circuit to regulate the current flowing through the load; and output the trimming signal to set the variable voltage to a value in excess of the decreased variable voltage where the current regulating circuit failed to regulate the current flowing through the load.

In an embodiment, a method for setting a variable voltage output by a tunable voltage regulator for application to a load that passes a current regulated by a current regulator circuit comprises: controlling the tunable voltage regulator to output a decreasing variable voltage; sensing the decreasing variable voltage; sensing a drop voltage at the current regulator circuit; determining from the sensed decreasing variable voltage and the sensed drop voltage a failure of the current regulating circuit to regulate the current passing through the load; and setting the variable voltage output to a value in excess of the decreased variable voltage where it was determined that the current regulating circuit failed to regulate the current passing through the load.

In an embodiment, a circuit comprises: a tunable voltage regulator having an output configured to generate a variable voltage and having an input configured to receive a trimming signal for controlling the output variable voltage; a current regulating circuit configured to regulate a current flowing through a load in response to the variable voltage; a control circuit configured to sense the variable voltage and a drop voltage of the current regulating circuit and in response thereto determine whether the current regulating circuit has failed to regulate the current flowing through the load because the variable voltage is too low, the control circuit further configured to respond to said determination by generating the trimming signal to set the variable voltage to a value sufficient for the current regulating circuit to successfully regulate the current flowing through the load.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
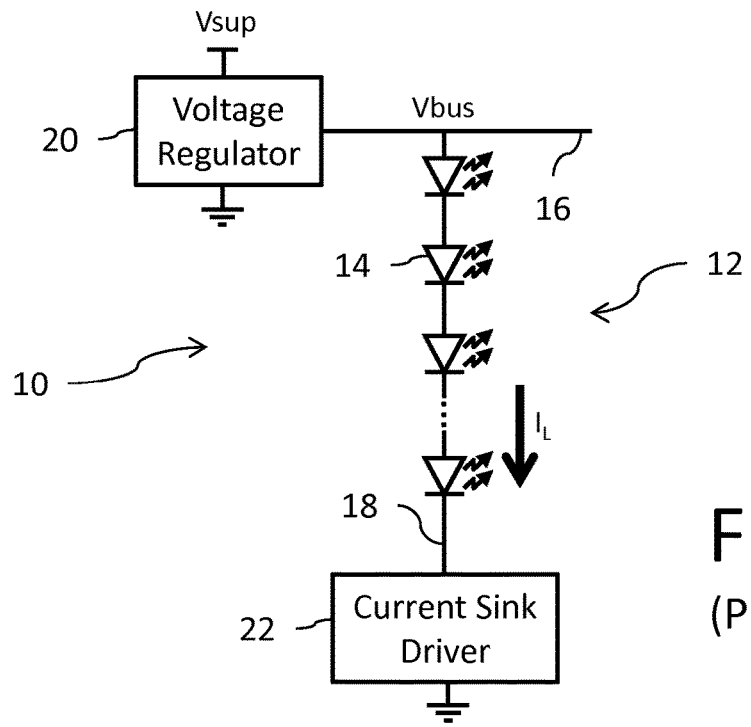
FIG. 1 is a circuit diagram for a conventional light emitting diode circuit.
Figure 2:
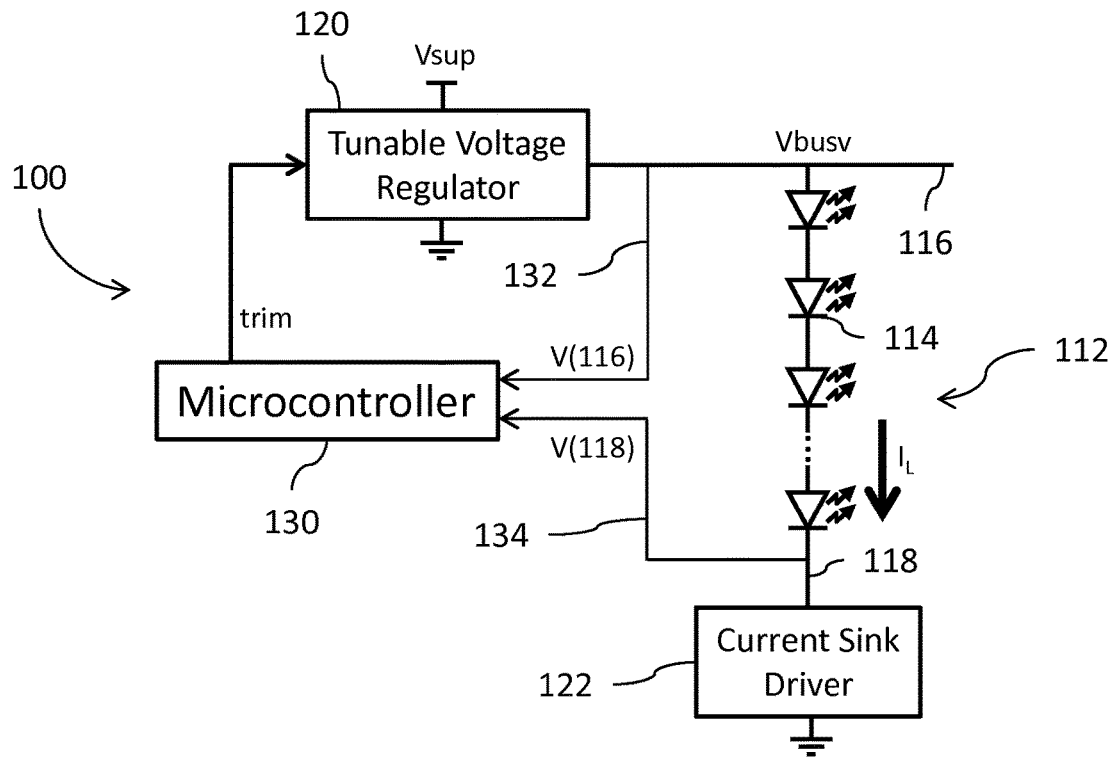
FIG. 2 is a circuit diagram for a light emitting diode circuit with a regulated minimum bus supply voltage.

Reference is now made to FIG. 2 showing a light emitting diode (LED) circuit 100. The circuit 100 includes a load circuit 112 formed by a string of series connected light emitting diodes (LEDs) 114. The string is connected between a node 116 and node 118. Node 116 may correspond to a supply bus in an implementation of the circuit 100 including plural strings of LEDs. A tunable voltage regulator 120 is coupled to receive an unregulated supply voltage Vsup and operates to generate a variable bus voltage Vbusv that is applied to the supply bus at node 116. A current sink driver circuit 122 is connected to node 118 and operates to regulate a constant load current $I_L$ through the load circuit 112 formed by the string of LEDs.

The variable bus voltage Vbusv must equal or exceed a minimum voltage Vmin in order for the current sink driver circuit 122 to be capable of operation to regulate a constant current $I_L$ in the string. Consider the following Table which illustrates operation of the circuit 100 in response to changes in the variable bus voltage Vbusv:

| Vbusv | $I_L$ |
|---|---|
| 11.50 V | 304 mA |
| 11.25 V | 305 mA |
| 11.00 V | 305 mA |
| 10.75 V | 305 mA |
| 10.50 V | 305 mA |
| 10.25 V | 304 mA |
| 10.00 V | 290 mA |

Figure 3:
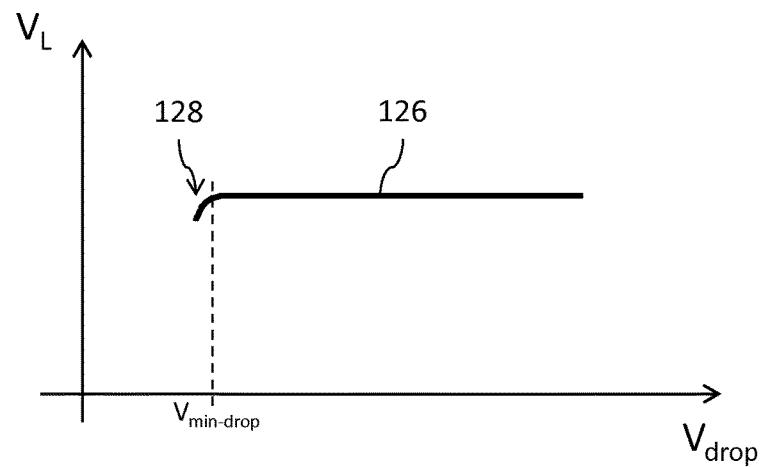
FIG. 3 illustrates regulated operation for the circuit of FIG. 2.

The Table shows an example operation of the circuit 100 with a constant current IL set equal to about 304 mA (±approximately 0.5%). When variable bus voltage Vbusv falls below about 10.25 V, the current sink driver circuit 122 is no longer able to regulate the current and the current drops significantly by about 5% to 290 mA. The foregoing relationship may be graphically presented as shown in FIG. 3 with curve 126 that plots the voltage drop $V_L$ across the load formed by the string of LEDs from node 16 to node 18 against the voltage drop $V_{drop}$ across the channel of the MOSFET device within the current sink driver circuit 122 (it being understood that $V_L$ and $V_{drop}$ vary dependent on changes in the variable bus voltage Vbusv). The voltage drop $V_L$ across the load remains substantially constant versus change in $V_{drop}$ so long as the variable bus voltage Vbusv equals or exceeds the minimum voltage Vmin. However, a knee point 128 is reached in the operation curve 126 when the variable bus voltage Vbusv falls below the minimum voltage Vmin. This corresponds to the point where $V_{min\text{-}drop}$ (the minimum required "drop-out" voltage across the channel of the MOSFET device within the current sink driver circuit 22 needed to maintain a regulated output for the load current $I_L$) is located. The voltage drop $V_L$ across the load is no longer constant for changes in $V_{drop}$ below $V_{min\text{-}drop}$, and in this condition the load current $I_L$ is no longer regulated.

In order to minimize power dissipation for operation of the circuit 100 with the current sink driver circuit 122 operating to regulate a constant current $I_L$ in the string, it is important to set the value of the variable bus voltage Vbusv at a level which places the voltage drop $V_{drop}$ across the channel of the MOSFET device within the current sink driver circuit 122 slightly above the knee point corresponding to the minimum required "drop-out" voltage $V_{min\text{-}drop}$. In other words, the variable bus voltage Vbusv generated by the voltage regulator 120 should be set at a value which substantially equals (or slightly exceeds) the instantaneous minimum voltage Vmin necessary to achieve a regulated constant current $I_L$ in the string (for example, Vmin<Vbusv<Vmin+0.5%).

In the circuit 100, the generated variable bus voltage Vbusv is tunable in response to a trimming signal (trim). A control circuit 130, for example in the format of a microcontroller, generates the trimming signal and effectuates changes in the trim signal so as to set the value of the variable bus voltage Vbusv to satisfy the operating condition mentioned in the preceding paragraph. The control circuit 130 operates to sense the voltages at the nodes 116 and 118, referred to herein as V116 and V118, respectively, using voltage sensing inputs 132 and 134. For example, the control circuit 130 may include one or more analog-to-digital converters (ADC) coupled to convert the analog voltage at each of nodes 116 and 118 to corresponding digital signals indicative of the sensed voltage levels. The sensed voltages at nodes 116 and 118 are monitored by the control circuit 130 while the control circuit 130 operates to change the variable bus voltage Vbusv by changing the trimming signal applied to the tunable voltage regulator 120. From the monitored voltages at nodes 116 and 118, the control circuit 130 identifies the value of the variable bus voltage Vbusv associated with the knee point 128 where the current sink driver circuit 122 no longer operates to regulate a constant current $I_L$. The control circuit 130 then sets the value of the variable bus voltage Vbusv using the trimming signal to a value which substantially equals (or slightly exceeds) the instantaneous minimum voltage Vmin necessary to achieve a regulated constant current $I_L$ in the string (for example, Vmin<Vbusv<Vmin+0.5%). This will configure operation of the circuit 100 with respect to curve 126 on the right side of the knee point 128 and the minimum required "drop-out" voltage $V_{min\text{-}drop}$.

Figure 4:
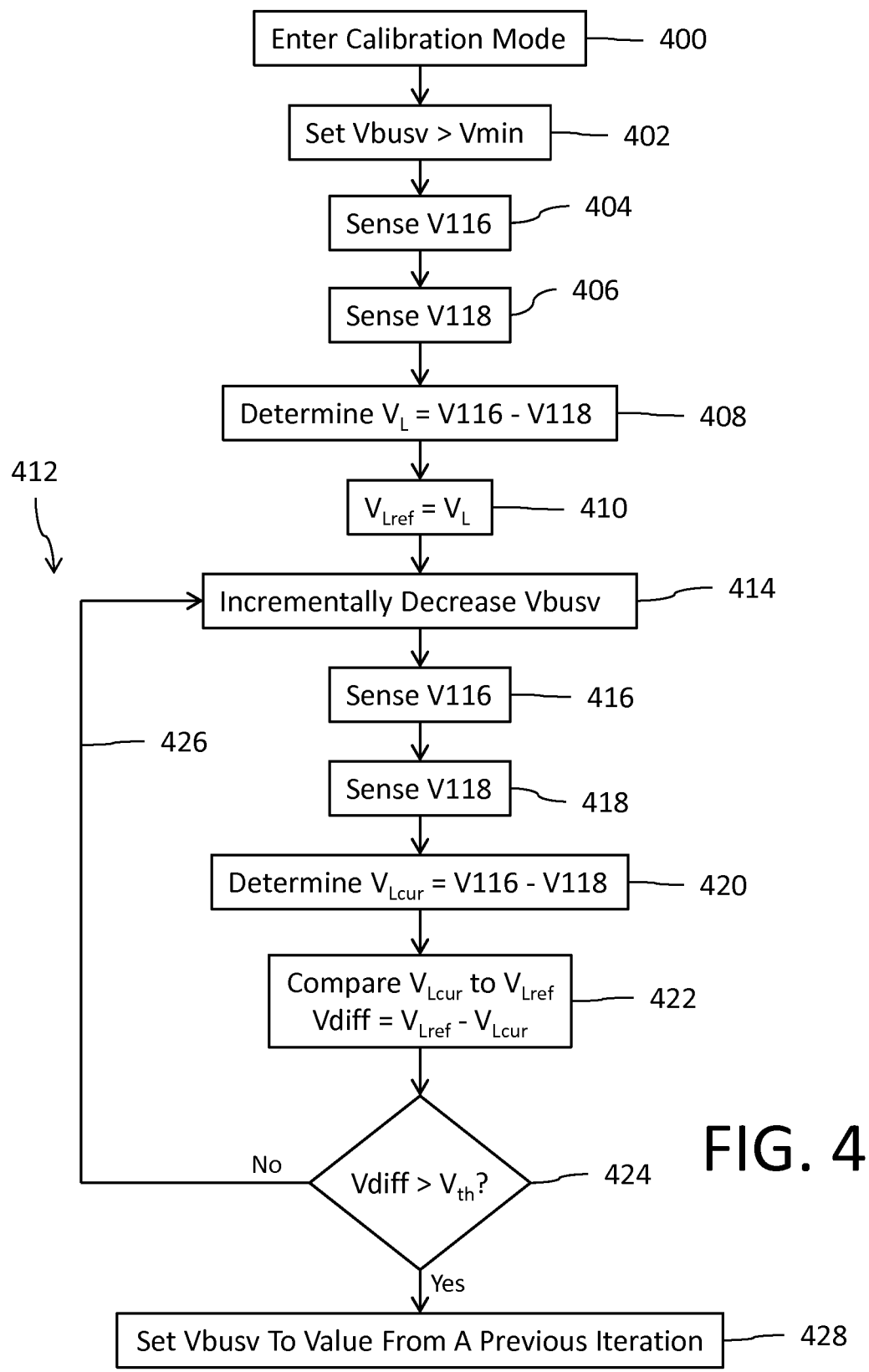
FIG. 4 is a flow diagram for a process to configure a variable voltage for the bus supply voltage.

Reference is now made to FIG. 4 showing a flow diagram for operation of the control circuit 130 for setting the variable bus voltage Vbusv. This process may, for example, be executed by the control circuit 130 in a calibration mode of operation for the circuit 100. In step 400, calibration mode is entered. In step 402, the control circuit 130 controls the trimming signal to cause the tunable voltage regulator 120 to output a variable bus voltage Vbusv which is in excess of the minimum voltage Vmin. The control circuit 130 next senses the voltage at node 116 (step 404); senses the voltage at node 118 (step 406); calculates the voltage $V_L$=V116−V118 (step 408); and saves the voltage $V_L$ (step 410) as a reference voltage $V_{Lref}$. A control loop 412 is then entered where the control circuit 130, with each iteration through the loop 412: incrementally decreases (step 414) the variable bus voltage Vbusv output by the tunable voltage regulator 120; senses the voltage at node 116 (step 416); senses the voltage at node 118 (step 418); calculates a current voltage $V_{Lcur}$=V116−V118 (step 420); and compares that current voltage $V_{Lcur}$ to the reference voltage $V_{Lref}$ (step 422). In step 424, the control circuit 130 determines whether a difference voltage Vdiff=$V_{Lref}$−$V_{Lcur}$ exceeds a threshold voltage $V_{th}$. If no, the process returns (step 426) to repeat another iteration through the control loop 412. If yes, the knee point 128 has been reached (and perhaps exceeded), and the control circuit 130 sets the variable bus voltage Vbusv to a value associated with one of the previous iterations through the control loop 412 (step 428).

Consider the following Table which illustrates operation of the circuit 100 using the process of FIG. 4:

| Vbusv | Vdiff | Vth | $I_L$ | |
|---|---|---|---|---|
| 11.50 V | 2 mV | 40 mV | 304 mA | In regulation |
| 11.25 V | 2 mV | 40 mV | 305 mA | |
| 11.00 V | 2 mV | 40 mV | 305 mA | |
| 10.75 V | 4 mV | 40 mV | 305 mA | |
| 10.50 V | 15 mV | 40 mV | 305 mA | |
| 10.25 V | 23 mV | 40 mV | 304 mA | |
| 10.00 V | 71 mV | 40 mV | 290 mA | Out of regulation |
| 10.25 V | | | | Set value for operation |

The Table shows the iterative process of progressively incrementally decreasing the variable bus voltage Vbusv and determining the difference voltage Vdiff. When the difference voltage Vdiff is less than the threshold voltage $V_{th}$, the determination of step 424 is not satisfied and the process returns through step 426 to repeat with an incrementally reduced value of the variable bus voltage Vbusv. However, when the difference voltage Vdiff exceeds the threshold voltage $V_{th}$, the determination of step 424 is satisfied and the variable bus voltage Vbusv is increased and set in step 428 to a value of a previous iteration where the circuit is operating with current regulation. This set variable bus voltage Vbusv value, however, reduces power waste because the circuit is configured for operation with a variable bus voltage Vbusv just slightly above the minimum voltage Vmin.

Figure 5:
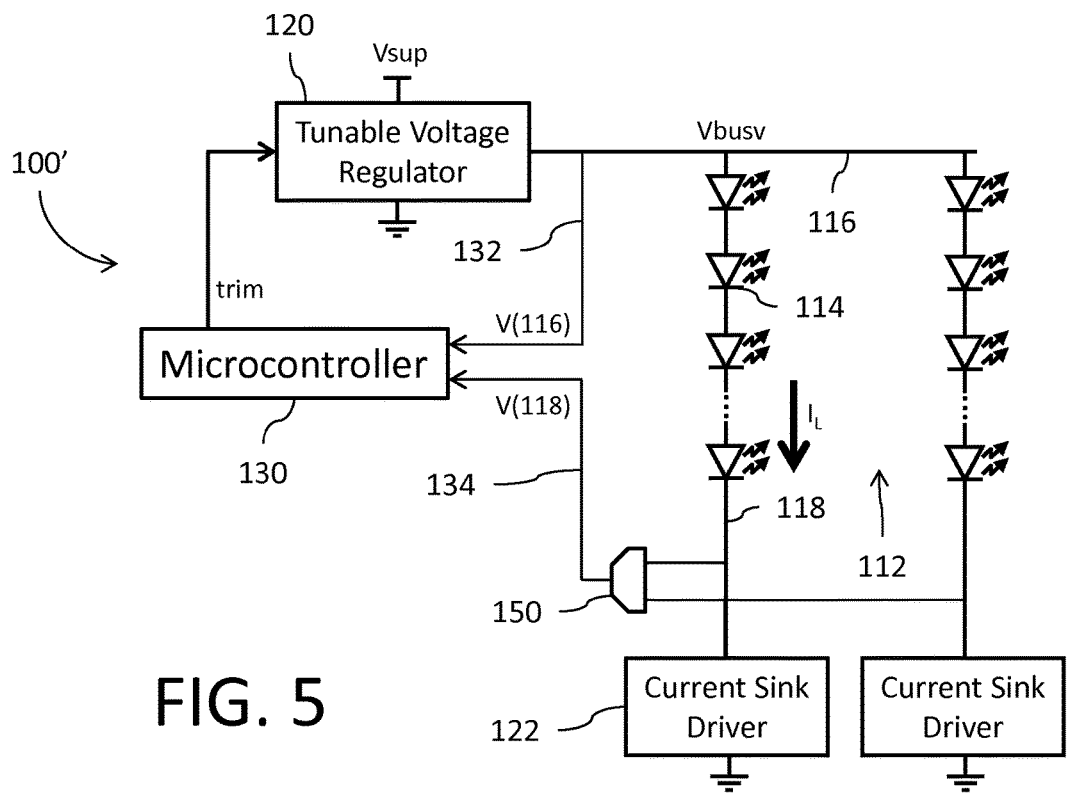
FIG. 5 is a circuit diagram for a light emitting diode circuit with a regulated minimum bus supply voltage.

Reference is now made to FIG. 5 showing a light emitting diode (LED) circuit 100'. The circuit 100' is substantially identical to the circuit 100 of FIG. 3 except that circuit 100' includes plural strings of LEDs for the load 112. In this configuration, each individual string of LEDs has its own current sink driver circuit 122. An effort may be made to ensure that the current sink driver circuits 122 are matching, but this cannot be assured to maintain over time. The circuit 100' accordingly utilizes a multiplexer 150 to select the V118 voltage from each string of LEDs for processing in accordance with FIG. 4. In an embodiment, the multiplexer 150 may be a component part of the control circuit 130. The control circuit 130 will operate to set the variable bus voltage Vbusv value based on the worst case scenario of circuit 100' operation. The worst case scenario represents the worst possible voltage $V_L$ across a string of LEDs and the worst possible voltage drop $V_{drop}$ across the channel of the MOSFET device within one of the current sink driver circuits 122. The process of FIG. 4 will perform the iterative process with respect to determining the knee point 128 for each string of LEDs and then set the variable bus voltage Vbusv value to ensure proper operation of all strings of LEDs.

Figure 6:
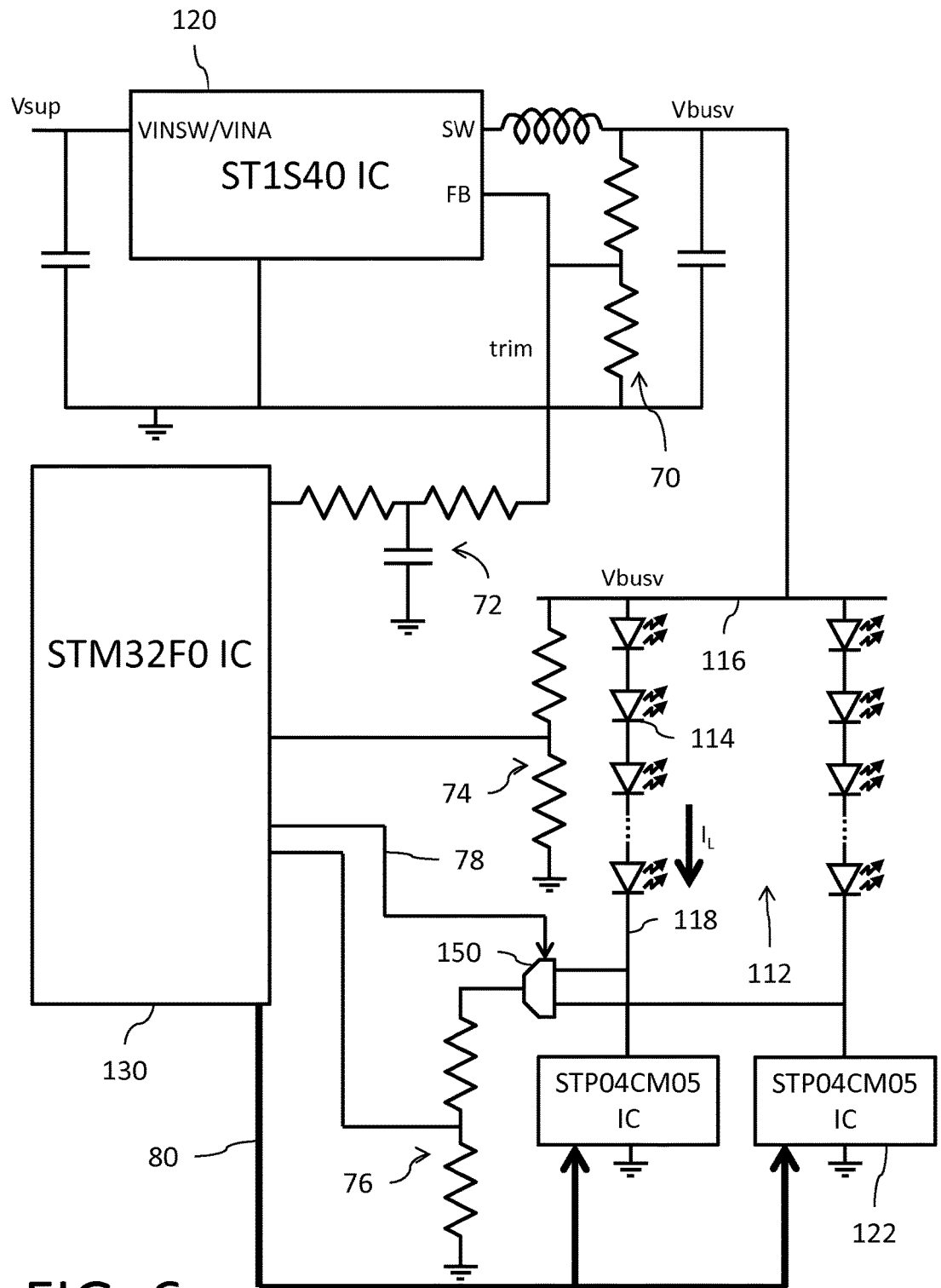
FIG. 6 is a practical circuit implementation of the circuits of FIGS. 2 and 5.

Reference is now made to FIG. 6 showing a practical circuit implementation of the circuits 100 and 100'. The tunable voltage regulator 120 may be implemented using an ST1S40 integrated circuit. The resistive voltage divider 70 generates the feedback voltage for regulating the output voltage Vbusv. The trimming signal (trim) is also applied to the feedback input of the regulator 120. The trimming signal is an analog voltage generated by a low pass filter circuit 72 from a pulse width modulated (PWM) signal output from the control circuit 130. The control circuit may be implemented by an STM32F0 integrated circuit programmed to implement the process of FIG. 4. A resistive voltage divider 74 senses the voltage at node 116 and applies a divided version of the V116 voltage to an input of the STM32F0 integrated circuit. An analog-to-digital converter within the STM32F0 integrated circuit converts the sensed voltage at node 116 to a digital value for processing in accordance with the process of FIG. 4. A resistive voltage divider 76 senses the voltage at node 118 of each string of LEDs through the multiplexer 150 and applies a divided version of the V118 voltage to an input of the STM32F0 integrated circuit. An analog-to-digital converter within the STM32F0 integrated circuit converts the sensed voltage at node 118 to a digital value for processing in accordance with the process of FIG. 4. The control circuit 130 control selection of signals made by the multiplexer 150 through a control signal 78. The current sink driver circuit 122 may be implemented using an STP04CM05 integrated circuit. Control signals for controlling operation of the STP04CM05 integrated circuit are generated by the control circuit 130 and applied to appropriate inputs of the current sink driver circuit 122 on bus interface 80.

The foregoing description has been provided by way of exemplary and non-limiting examples of a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit, comprising:
    a load coupled between a first node and a second node;
    a current regulating circuit coupled to the second node and configured to regulate a current flowing through the load;
    a tunable voltage regulator having an output configured to generate a variable voltage applied to the first node, said tunable voltage regulator having input configured to receive a trimming signal for controlling the output variable voltage;
    a control circuit having a first input configured to sense the variable voltage at the first node, a second input configured to sense a drop voltage at the second node, and having an output configured to generate the trimming signal, said control circuit configured to operate to:
        vary the trimming signal to cause the variable voltage to decrease;
        determine a difference between the sensed decreasing variable voltage and the sensed drop voltage;
        identify that the current regulating circuit is failing to regulate the current flowing through the load if the determined difference exceeds a threshold; and
        output the trimming signal to set the variable voltage to a value in excess of a decreased variable voltage where the current regulating circuit failed to regulate the current flowing through the load.

2. The circuit of claim 1, wherein the load comprises at least one string of light emitting diodes.

3. The circuit of claim 1, wherein the load comprises a plurality of strings of light emitting diodes.

4. The circuit of claim 1, wherein the trimming signal is a filtered pulse width modulated signal.

5. A method for setting a variable voltage output by a tunable voltage regulator for application to a load that passes a current regulated by a current regulator circuit, comprising:
    controlling the tunable voltage regulator to output a decreasing variable voltage;
    sensing the decreasing variable voltage;
    sensing a drop voltage at the current regulator circuit;
    determining a difference between the sensed decreasing variable voltage and the sensed drop voltage;
    identifying that the current regulating circuit is failing to regulate the current passing through the load if the determined difference exceeds a threshold; and
    setting the variable voltage output to a value in excess of a decreased variable voltage where it was determined that the current regulating circuit failed to regulate the current passing through the load.

6. The method of claim 5, wherein controlling the tunable voltage regulator comprises incrementally decreasing the variable voltage in steps.

7. The method of claim 6, wherein determining comprises determining at each step.

8. The method of claim 7, wherein setting comprises setting the value of the variable voltage to a previous value of the variable voltage associated with a previous step.

9. The method of claim 5, as implemented in a calibration mode of operation.

10. A circuit, comprising:
   a tunable voltage regulator having an output configured to generate a variable voltage and having an input configured to receive a trimming signal for controlling the output variable voltage;
   a current regulating circuit configured to regulate a current flowing through a load in response to the variable voltage;
   a control circuit configured to sense the variable voltage and a drop voltage of the current regulating circuit and in response thereto determine a difference between the sensed variable voltage and the sensed drop voltage and identify that the current regulating circuit has failed to regulate the current flowing through the load if the determined difference exceeds a threshold, the control circuit further configured to respond to said identification by generating the trimming signal to set the variable voltage to a value sufficient for the current regulating circuit to successfully regulate the current flowing through the load.

11. The circuit of claim 10, wherein the control circuit operates in a calibration mode to control the tunable voltage regulator through the trimming signal to incrementally decrease the variable voltage until the identification is made that the current regulating circuit has failed to regulate the current flowing through the load.

12. The circuit of claim 11, wherein the control circuit further operates to control the tunable voltage regulator to set a value of the variable voltage at level in excess of the incrementally decreased value associated with the identification that the current regulating circuit has failed to regulate the current flowing through the load.

13. The circuit of claim 10, further comprising the load connected between the tunable voltage regulator and the current regulating circuit.

14. The circuit of claim 13, wherein the load comprises at least one string of light emitting diodes.

15. The circuit of claim 10, wherein the trimming signal is a filtered pulse width modulated signal.

* * * * *